(12) United States Patent
Tchapda

(10) Patent No.: US 10,073,725 B2
(45) Date of Patent: Sep. 11, 2018

(54) DISTRIBUTED INPUT/OUTPUT VIRTUALIZATION

(71) Applicant: Micron Technology, Inc., Boise, ID (US)

(72) Inventor: Yves Tchapda, Manchester (GB)

(73) Assignee: Micron Technology, Inc., Boise, ID (US)

(*) Notice: Subject to any disclaimer, the term of this patent is extended or adjusted under 35 U.S.C. 154(b) by 119 days.

(21) Appl. No.: 15/041,207

(22) Filed: Feb. 11, 2016

(65) Prior Publication Data

US 2017/0235584 A1    Aug. 17, 2017

(51) Int. Cl.
| G06F 11/00 | (2006.01) |
| G06F 11/07 | (2006.01) |
| G06F 9/455 | (2018.01) |
| G06F 13/10 | (2006.01) |
| G06F 11/32 | (2006.01) |
| G06F 13/24 | (2006.01) |
| G06F 13/40 | (2006.01) |
| H04L 12/24 | (2006.01) |
| G06F 13/42 | (2006.01) |

(Continued)

(52) U.S. Cl.
CPC ...... *G06F 11/0712* (2013.01); *G06F 9/45558* (2013.01); *G06F 11/0709* (2013.01); *G06F 11/1423* (2013.01); *G06F 11/301* (2013.01); *G06F 11/3006* (2013.01); *G06F 11/327* (2013.01); *G06F 13/102* (2013.01); *G06F 13/24* (2013.01); *G06F 13/4022* (2013.01); *G06F 13/4282* (2013.01); *H04L 41/0803* (2013.01); *G06F 2009/45579* (2013.01)

(58) Field of Classification Search
CPC ............ G06F 11/1423; G06F 11/3006; G06F 11/301; G06F 11/327; G06F 11/0709; G06F 11/0712; G06F 11/0745; G06F 9/45558; G06F 13/102; G06F 13/24; G06F 13/4022; G06F 13/4282; G06F 2009/45579; H04L 41/0803
USPC ................................................... 714/57, 44
See application file for complete search history.

(56) References Cited

U.S. PATENT DOCUMENTS

| 2005/0044301 A1 | 2/2005 | Vasilevsky et al. |
| 2007/0220376 A1* | 9/2007 | Furukawa ........... G06F 11/0727 714/57 |
| 2008/0307116 A1 | 12/2008 | Boyd et al. |

(Continued)

FOREIGN PATENT DOCUMENTS

WO    2010063985 A1    6/2010

OTHER PUBLICATIONS

International Search Report and Written Opinion from related international application No. PCT/US2017/015585, dated May 12, 2017, 14 pp.

(Continued)

*Primary Examiner* — Joseph D Manoskey
(74) *Attorney, Agent, or Firm* — Brooks, Cameron & Huebsch LLP

(57) ABSTRACT

The present disclosure includes apparatuses and methods related to distributed input/output (I/O) virtualization. A number of embodiments include an apparatus comprising a host computing device, a distributed virtualization controller (DVC) disposed on the host computing device, and a virtualized input/output (I/O) device in communication with the DVC.

29 Claims, 3 Drawing Sheets

(51) Int. Cl.
*G06F 11/14* (2006.01)
*G06F 11/30* (2006.01)

(56) References Cited

U.S. PATENT DOCUMENTS

| | | |
|---|---|---|
| 2009/0150563 A1 | 6/2009 | Piekarski |
| 2010/0146074 A1* | 6/2010 | Srinivasan .............. H04L 67/10 |
| | | 709/218 |
| 2011/0246986 A1* | 10/2011 | Nicholas ............. G06F 11/0712 |
| | | 718/1 |
| 2012/0131590 A1 | 5/2012 | Brownlow et al. |
| 2014/0201736 A1 | 7/2014 | Mizrahi et al. |
| 2017/0132029 A1* | 5/2017 | Cui .................... G06F 9/45558 |

OTHER PUBLICATIONS

Office Action from related Taiwanese patent application No. 106104350, dated Jul. 4, 2018, 16 pages.

* cited by examiner

DISTRIBUTED INPUT/OUTPUT VIRTUALIZATION

TECHNICAL FIELD

The present disclosure relates generally to distributed computing architectures, and more particularly, to systems, methods, and apparatuses related to distributed input/output (I/O) virtualization in computing architectures.

BACKGROUND

Distributed computing architectures are typically characterized by the sharing of components of a software system and/or hardware system among multiple host computing devices (e.g., physical computing resources, computers, servers, clusters, etc. that are connected to a computer network). For example, a distributed computing architecture can include a plurality of host computing devices that share one or more software components and/or physical computing resources (e.g., access to hardware components). The host computing devices can be distributed within a limited geographic area, or they may be widely distributed across various geographic areas. To facilitate sharing of the software and/or physical computing resources, the host computing devices can be in communication with a network switch, management host, and/or other device(s) that can allow for interaction between the host computing devices.

In the example of a host computing device configured to be in communication with a network switch, the switch can route data packets from an output of one host computing device to an input of one or more other host computing devices. In this manner, various software components and/or hardware components may be shared among host computing devices in a distributed computing architecture.

DETAILED DESCRIPTION

Figure 1:
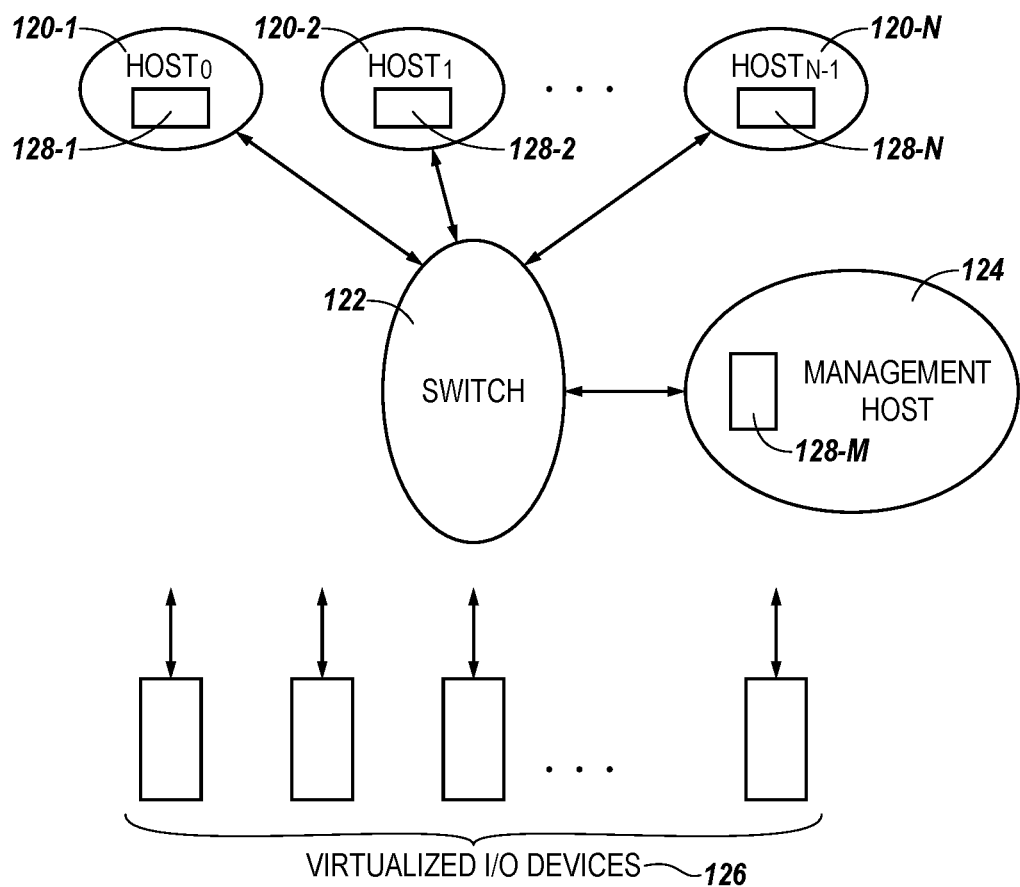
FIG. 1 is a block diagram of a system for distributed I/O virtualization in accordance with a number of embodiments of the present disclosure.

The present disclosure includes systems, methods, and apparatuses related to distributed input/output (I/O) virtualization in computing architectures. A number of embodiments include an apparatus comprising a host computing device, a distributed virtualization controller (DVC) disposed on the host device, and a virtualized input/output (I/O) device in communication with the DVC.

A number of embodiments of the present disclosure include a method for distributed input/output (I/O) virtualization comprising intercepting an input/output (I/O) transaction at a distributed virtualization controller (DVC) disposed on a host computing device, identifying, in a virtualization layer associated with the DVC, a physical I/O to receive the I/O transaction, and forwarding the I/O transaction to a physical layer associated with the DVC.

As discussed above, certain software components and/or physical computing resources are commonly shared among host computing devices in a distributed computing architecture. However, some conventional distributed computing architectures do not share input/output (I/O) devices. For example, in some conventional distributed computing architectures, there are one or more respective, dedicated I/O devices associated with each host computing device.

Some attempts to allow I/O devices to be shared host computing devices have been made using what is referred to as I/O virtualization. I/O virtualization can allow host computing devices associated with a particular I/O device to be shared among a plurality of host computing devices. Although I/O virtualization can allow an I/O device to appear to function as more than one I/O device even though each virtual I/O device is associated with a particular host computing device, some currently available schemes involving I/O virtualization can suffer from a number of shortcomings.

For example, some approaches to I/O virtualization have limited scalability because they are either software-based or rely on a centralized controller to provide I/O virtualization functionality. However, such approaches can be inadequate as bandwidth increases and I/O processing requirements become more stringent. In addition, as the number of host computing devices (e.g., servers and/or clusters) in a distributed computing architecture increases, system requirements likewise increase, further compounding adverse effects in the performance of such systems. In order to address these shortcomings, some approaches to I/O virtualization have included adding an additional controller or controllers, for example, a centralized virtual controller. However, adding additional controllers adds expense and complexity to the system, and can suffer from limited scalability.

In contrast, embodiments of the present disclosure include a distributed computing architecture where the virtualization functionality is distributed to host computing devices in the distributed computing architecture and implemented in hardware. In at least one embodiment, the distributed computing architecture described herein can include the use of a protocol with a multi-queue interface (e.g., non-volatile memory host controller interface working group (NVMe), Intel® virtual machine device queues (VMDq), etc.), or can include the use of a multi-function peripheral component interconnect express (PCIe) I/O such as a single root I/O virtualization compliant I/O device.

Some embodiments of the present disclosure can allow for increased performance in comparison to some previous approaches that rely on centralized virtualization controllers, for example, because, in contrast to such approaches, transaction completions do not necessarily traverse the switch fabric multiple times. For example, an I/O transaction from a virtualized I/O may only traverse the network switch once. As a result, latency can be improved in comparison to some previous approaches. In addition, some embodiments can allow for improvements to scalability versus some previous approaches, because distributing the virtualization functionality to one or more host computing devices in the distributed computing architecture does not require additional controllers. Further, a performance footprint of a distributed I/O virtualization architecture can be increased because the virtualization functionality is portioned across multiple devices.

In some embodiments, memory allocated for virtualization can be distributed, as opposed to being associated with a single location, as in some previous approaches. For example, in some embodiments, memory allocated for virtualization can be provided by a plurality of host computing devices in a distributed computing architecture. In some embodiments, some portion of the memory associated with one or more of the host computing devices can be used to augment the virtualization functionality.

In addition, embodiments of the present disclosure can allow for decrease in complexity associated with deploying a plurality of centralized controllers and/or in managing errors. Moreover, extra switching ports that can be used by centralized controllers in some previous approaches can be made available for additional host computing devices and/or I/Os, and/or the size of the switching fabric could be reduced, thereby decreasing costs associated with the distributed computing architecture.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, designators such as "N", "M", etc., particularly with respect to reference numerals in the drawings, indicate that a number of the particular feature so designated can be included. As used herein, "a number of" a particular thing can refer to one or more of such things (e.g., a number of memory arrays can refer to one or more memory arrays). A "plurality of" is intended to refer to more than one of such things.

The figures herein follow a numbering convention in which the first digit or digits correspond to the drawing figure number and the remaining digits identify an element or component in the drawing. Similar elements or components between different figures may be identified by the use of similar digits. For example, 150 may reference element "50" in FIG. 1, and a similar element may be referenced as 250 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of a system for distributed I/O virtualization in accordance with a number of embodiments of the present disclosure. As illustrated in FIG. 1, a plurality of host computing devices 120-1, 120-2, ..., 120-N, each including a respective distributed virtualization controller (DVC) 128-1, 128-2, 128-N are communicatively coupled to a plurality of virtualized I/O devices 126. The plurality of host computing devices 120-1, 120-2, ..., 120-N can be communicatively coupled to a plurality of virtualized I/O devices 126 through a switch 122 (e.g., a network switch). The virtualized I/O devices 126 can be network interface cards, storage devices, graphics rendering devices, or other virtualized I/O devices. In the example of FIG. 1, a single switch 122 is illustrated; however, other switching topologies can be used. For example, a multi-stage/cascading switching topology such as a tree structure (e.g., fat tree) can be used. In some embodiments, the system includes a management host 124 that includes a DVC 128-M.

In some embodiments, the DVCs 128-1, 128-2, ..., 128-N can be configured to provide various functionality that allows I/O devices among the virtualized I/O devices 126 to be effectively shared between the host computing devices 120-1, 120-2, ..., 120-N, and/or the management host computing device 124. For example, each respective DVC 128-1, 128-2, ..., 128-N can provide virtualization functionality to the host computing device on which it is disposed for one or more of the virtualized I/O devices 126. That is, in some embodiments, DVC 128-1 disposed on host computing device 120-1 can be configured such that one or more of the virtualized I/O devices 126 can be used by host computing device 120-1 while DVC 128-2 can be configured such that one or more of the virtualized I/O devices 126 can be used by host computing device 120-2. In some embodiments, each respective DVC 128-1, 128-2, ..., 128-N can be in communication with the management host computing device DVC 128-M through the switch 122 to coordinate virtualization functionality among the respective host computing devices 120-1, 120-2, ..., 120-N of the system. The functionality of the DVCs 128-1, 128-2, ..., 128-N are described in more detail in connection with FIG. 2, herein.

Figure 2:
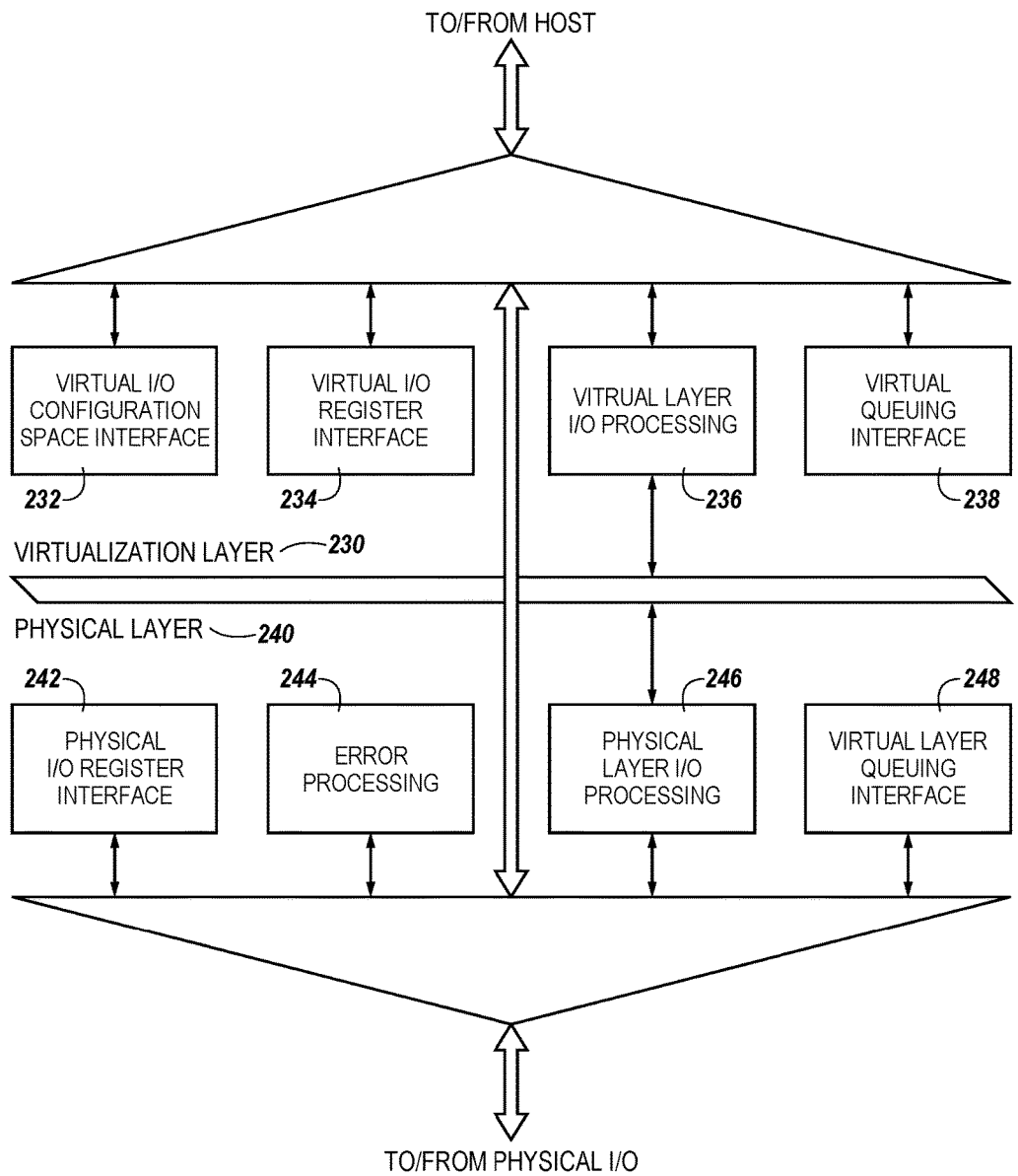
FIG. 2 is a block diagram of a distributed virtualization controller architecture in accordance with a number of embodiments of the present disclosure.

FIG. 2 is a block diagram of a distributed virtualization controller (DVC) architecture in accordance with a number of embodiments of the present disclosure. As illustrated in FIG. 2, the DVC includes a virtualization layer 230 and a physical layer 240. The virtualization layer 240 can communicate with system software (e.g., operating system software, BIOS software, etc.) running on the host computing devices (e.g., host computing devices 120-1, 120-2, ..., 120-N). In some embodiments, the virtualization layer 240 can expose one or more peripheral component interconnect (PCI) and/or one or more peripheral component interconnect express (PCIe) functions to the system software. Embodiments disclosed herein make reference to PCIe for simplicity; however, as one of ordinary skill in the art would appreciate, other interconnection systems such as PCI, among others, are contemplated.

The virtualization layer 230 can include a virtual I/O configuration space interface 232, a virtual I/O register interface 234, virtual layer I/O processing 236, and/or a virtual layer queuing interface 238. The physical layer 240 can include a physical I/O register interface 242, error processing engine 244, physical layer I/O processing 246, and/or physical layer queuing interface 248. In some embodiments, the components, blocks, and/or engines of the virtualization layer 230 and the physical layer 240 can include hardware and/or software, but include at least hardware, configured to perform certain tasks or actions. For example, the components of the virtualization layer 230 and the physical layer 240 can be in the form of an application specific integrated circuit (ASIC).

In some embodiments, the system software can detect a PCIe function that has been exposed by the DVC, and, in response, configures a virtual I/O device. Detection and configuration of the PCIe function can be carried out during enumeration, for example. The system software can then load any relevant device driver(s) for the virtual I/O device and attach them to the appropriate network driver stack. For example, if the I/O is a network interface card (NIC), the system software can load a NIC driver and attach it to the network driver stack. In some embodiments, the newly loaded driver configures the virtual I/O device as if it was directly addressing the physical I/O device. In some embodiments, the driver may set up various registers on its virtual I/O device.

In some embodiments, the DVC can receive support from a multi-queue interface. Since the host computing devices expect the I/O to support a queuing interface, the virtualization layer 230 can expose a queuing interface to the host computing devices. In some embodiments, virtual queuing interface 238 can be independent of a queuing interface associated with a physical I/O. For example, a single queue associated with the physical I/O being virtualized can be assigned to a DVC; however, the DVC can still expose multiple queues to the host computing devices.

The virtualization layer 230 can include virtual layer I/O processing 236. In some embodiments, virtual layer I/O processing 236 can include intercepting I/O transactions from the host computing devices by the DVC. These transactions can then be processed locally, for example, by virtual layer I/O processing 236. In some embodiments, virtual layer I/O processing 236 can be carried out using a push or pull methodology for I/O processing. For example, whether a push or pull methodology is used for I/O processing can be transparent to the architecture described herein.

Virtual layer I/O processing 236 is responsible for examining an I/O transaction from the host computing devices and determining if the I/O transaction is to be forwarded to a physical I/O. In some embodiments, the virtual layer I/O processing 236 block is responsible for identifying the physical I/O to receive the I/O transaction. For example, virtual layer I/O processing 236 can identify a physical I/O devices among a plurality of physical I/O devices in the system that is to receive a particular I/O transaction.

Upon completion of the I/O transaction, a notification can be sent to the host computing devices to indicate that the transaction has completed. The method of notification depends on schemes that are supported by the device drivers; however, in at least one embodiment, the notification can be in the form of an interrupt. For example, interrupt mechanisms such as INTx, MSI, and MSI-X can be used to provide the notification. Embodiments are not so limited; however, and polling (e.g., polled I/O or software-driven I/O) mechanisms may be used to provide the notification as well.

In some embodiments, the DVC is responsible for virtualizing I/Os to a single host computing device. This can simplify error isolation because each host computing device can be isolate from problems that occur on other host computing devices in the distributed computing architecture.

The physical layer 240 of the DVC can include a physical layer queuing interface 248 that can interface with actual, physical hardware in the system, and can be configured by management software. For example, during system initialization, management software can create device queues in the DVC. In some embodiments, the DVC can be disposed on a card that is coupled to host computing devices. For example, the DVC can be on a card that is physically coupled to host computing devices. The queues can be part of a multi-queue interface on a single device, or the queues can be part of a multi-queue interface on a multi-function I/O device (e.g., a single root I/O virtualization (SR-IOV) device).

In some embodiments, at least one queue on the DVC is assigned to physical I/O that supports a multi-queue interface. In the example of a SR-IOV-compliant I/O device, a virtual function on the physical I/O is mapped to a virtual I/O device on the DVC. In some embodiments, each I/O queue register (e.g., each I/O queue base address register) can be mapped 1:1 to physical layer queuing interface 248. For example, a first I/O queue register can be mapped to a respective queue on the DVC through the physical layer queuing interface.

The DVC can also include physical layer I/O processing 246. In some embodiments, when the virtualization layer 230 identifies a physical I/O to receive an I/O transaction, the transaction can be forwarded to the physical layer 240. In some embodiments, physical layer I/O processing 246 on the physical layer 240 can modify the address that points to the data associated with the transaction and can post the transaction to the physical I/O. In some embodiments, the transaction can be a storage command for a host bus adapter (HBA) and/or a descriptor for a NIC.

In some embodiments, the address can be a 64-bit memory address with 8 bits reserved for the routing field. The high address bits can be used for routing and/or to allow the I/O to access data from memory associated with one or more of the host computing devices. For example, address modification on the transaction can for routing purposes and can allow the I/O to access the data from the relevant storage location (e.g., host computing device memory). Embodiments are not so limited; however, and the size of the memory address and/or routing field can be smaller or larger provided the address includes enough bits to be useful for addressing purposes.

In some embodiments, distributed I/O virtualization allows for in-flight address modification. For example, an address that points to the data associated with an I/O transaction can be modified as it being fetched by the I/O device. This can allow for a reduction in the memory used by a virtualization system. In some embodiments, in-flight address modification can be dictated by the I/O interface protocol.

Physical layer I/O processing 246 can receive and/or process notifications from a physical I/O that a transaction is complete. In some embodiments, a transaction notification at the physical layer 240 is independent of a transaction notification at the virtual layer 230. In some embodiments, a notification can be implied based on a response from the physical I/O, while a notification of completion to the host computing device can be an explicit interrupt mechanism.

In some embodiments, the physical layer 240 of the DVC includes a physical I/O register interface 242. The physical I/O register interface can provide access to physical I/O registers to the DVC. For example, in some embodiments, physical I/O registers that are not part of the queuing interface are only written by the management host (e.g., management host 124 illustrated in FIG. 1). In some embodiments, the DVC can access the physical I/O registers as read-only. For example, physical I/O register interface 242 can allow the DVC to receive values associated with the physical I/O registers such that the DVC can communicate with the physical I/O registers without having to modify the values.

The physical layer 240 of the DVC can include error processing engine 244. In some embodiments, error processing engine 244 can emulate a response to indicate an error if communication between the DVC and one or more virtualized I/Os fails. For example, error processing engine 244 can emulate a completion abort (CA) or unsupported request (UR) response to indicate the error to the driver. For example, a PCIe CA or PCIe UR response can be emulated by the error processing engine 244. In some embodiments, this can prevent failure of the entire system and/or can prevent operating system crashes on the host computing devices. Should a failure occur, a recovery mechanism can be initiated on the physical I/O by the management host. For example, the management host can initiate a recovery mechanism in the form of a reset and/or power cycle of the physical I/O in response to a failure of the physical I/O or an indication that the physical I/O is non-responsive. In some embodiments, the recovery mechanism can be initiated using an out-of-band control path (e.g., a path that is independent of an in-band data path).

In some embodiments, quality of service (QoS) can be implemented on the virtualization layer 230 and the physical layer 240. On the virtual layer, the DVC can implement any QoS scheme (e.g., round robin, weighted round robin, WeightedFair queuing, etc.) across multiple queues associated with a virtual I/O. In some embodiments, these queues can be instanced or assigned to one or more virtual machines. Each queue can be assigned a weight or a strict priority scheme can be imposed.

At the physical layer 240, each physical I/O can be configured with arbitration priorities for each queue mapped to a DVC. For example, the physical I/O device can then use the queue priority to differentiate traffic between the host computing devices. In some embodiments, the DVC can implement an adaptive approach where one or more parameters can be adjusted to fit various QoS requirements.

Figure 3:
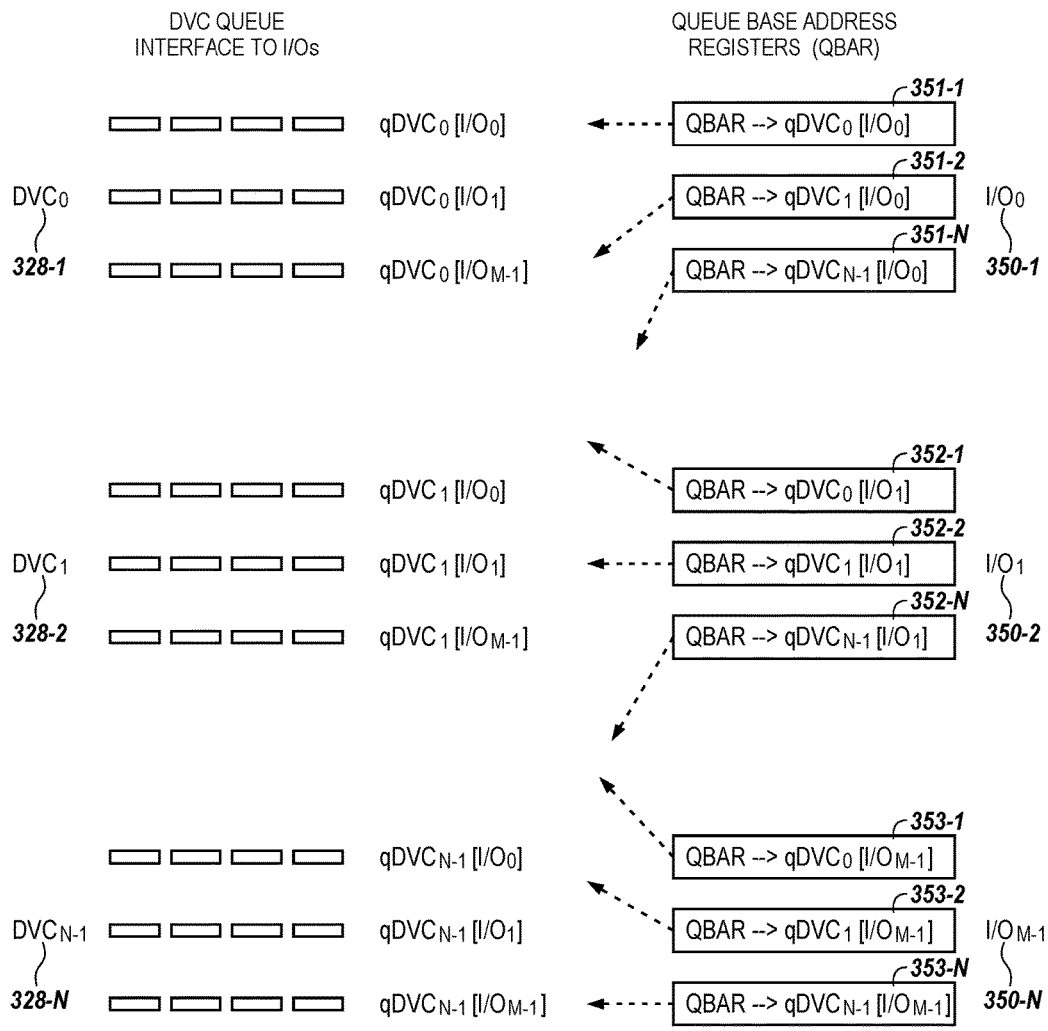
FIG. 3 is a diagram illustrating a queuing interface for a distributed I/O virtualization system in accordance with a number of embodiments of the present disclosure.

FIG. 3 is a diagram illustrating a queuing interface for a distributed I/O virtualization system in accordance with a number of embodiments of the present disclosure. In the example of FIG. 3, a system with N host computing devices and M I/Os is illustrated from the perspective of the DVC and the I/Os. As illustrated in FIG. 3, qDVC[I/O$_x$], represents a queue on the DVC that is mapped to I/O$_x$. Address registers associated with each I/O queue 350-1, 350-2, ..., 350-N can be mapped to each respective DVC 328-1, 328-2, ..., 328-N.

In some embodiments, each I/O register 350-1, 350-2, ..., 350-N can have a plurality of queue base address registers (QBAR) associated therewith. For example, a first I/O register 350-1 can have a first QBAR qDVC$_0$[I/O$_x$]351-1, a second QBAR qDVC$_1$[I/O$_x$]351-2, and an (n−1)$^{th}$ QBAR qDVC$_{N-1}$[I/O$_x$]351-N associated therewith. Similarly, additional I/O registers (e.g., I/O registers 350-2, ..., 350-N) can have a plurality of QBARs associated therewith.

As illustrated in FIG. 3, the QBARS associated with the various I/Os 350-1, 350-2, ..., 350-N can be mapped to respective DVCs 328-1, 328-2, ..., 328-N such that a respective QBAR (e.g., QBAR 351-1, 351-2, ..., 351-N, 352-1, 352-2, ... 352-N) associated with each I/O 350-1, 350-2, ..., 350-N is exposed to the respective DVC 328-1, 328-2, ..., 328-N. For example, QBAR 351-1 associated with I/O 350-1 can be mapped to the first queue of DVC$_0$ 328-1, QBAR 351-2 associated with I/O 350-1 can be mapped to the first queue of DVC$_1$ 328-2, and QBAR 351-N associated with I/O 350-1 can be mapped to the first queue of DVC$_{N-1}$ 328-N. Similarly, a QBAR 352-1 associated with I/O 350-2 can be mapped to the second queue of DVC$_0$ 328-1, QBAR 352-2 associated with I/O 350-2 can be mapped to the second queue of DVC$_1$ 328-2, and QBAR 352-N associated with I/O 350-2 can be mapped to the second queue of DVC$_{N-1}$ 328-N. This mapping can continue for an n$^{th}$ DVC and an n$^{th}$ I/O such that QBAR 353-1 associated with I/O 353-N can be mapped to an n$^{th}$ queue of DVC$_0$ 328-1, QBAR 353-2 associated with I/O 353-N can be mapped to an n$^{th}$ queue of DVC$_1$ 328-2, and QBAR 353-N associated with I/O 353-N can be mapped to an n$^{th}$ queue of DVC$_{N-1}$ 328-N.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a host computing device;
   a distributed virtualization controller (DVC) comprising circuitry physically disposed on the host computing device; and
   a virtualized input/output (I/O) device in communication with the DVC, wherein the virtualized I/O device is configured to share resources of the virtualized I/O device between the host computing device and another host computing device coupled to the virtualized I/O device and wherein the DVC is configured to virtualize the I/O device to the host computing device on which the DVC is physically disposed.

2. The apparatus of claim 1, further comprising a management host computing device including a DVC disposed thereon, wherein the management host computing device is in communication with a network switch.

3. The apparatus of claim 2, wherein the management host computing device is configured to initiate a recovery mechanism on a physical I/O device in communication with the DVC in response to an error condition.

4. The apparatus of claim 1, wherein the DVC is configured to expose at least one queue to the host computing device.

5. The apparatus of claim 4, wherein the at least one queue is part of a multi-queue interface.

6. The apparatus of claim 4, wherein the at least one queue is associated with a multi-function I/O device.

7. The apparatus of claim 1, wherein the DVC comprises a virtualization layer and a physical layer, the virtualization layer exposes at least one peripheral device to the host computing device, and the physical layer provides an interface between a physical I/O device and the host computing device.

8. The apparatus of claim 7, wherein the at least one peripheral device is a peripheral component interconnect express (PCIe) device.

9. The apparatus of claim 1, wherein the DVC configures a virtual I/O device based at least in part on the host computing device detecting a peripheral device.

10. The apparatus of claim 1, wherein the DVC is configured to map a function associated with a physical I/O device to a virtualized I/O device on the DVC to provide communication between the virtualized I/O device and the DVC.

11. A system, comprising:
a first host computing device including a first distributed virtualization controller (DVC) comprising circuitry physically disposed on the first host computing device;
a second host computing device including a second DVC comprising circuitry physically disposed on the second host computing device, wherein the first DVC and the second DVC are in communication with at least one virtualized input/output (I/O) device, wherein the first DVC is configured to virtualize the at least one virtualized I/O device to the first host computing device, and wherein the second DVC is configured to virtualize the at least one virtualize I/O device to the second host computing device; and
a network switch in communication with the first host computing device and the second host computing device.

12. The system of claim 11, further comprising a management host computing device including a respective management host DVC, the management host computing device in communication with the switch.

13. The system of claim 11, further comprising a plurality of queue base address registers (QBARs) associated with the at least one virtualized I/O device.

14. The system of claim 13, wherein a first QBAR associated with the at least one virtualized I/O device is mapped to the first host computing device, and a second QBAR associated with the at least one virtualized I/O device is mapped to the second host computing device.

15. The system of claim 11, wherein an I/O transaction from the I/O device traverses the network switch only once.

16. A distributed virtualization controller (DVC), comprising:
a virtualization layer input/output (I/O) processing block;
a physical layer I/O processing block; and
a queuing interface,
wherein the virtualization layer I/O processing block is configured to:
determine if an I/O transaction is to be forwarded to a physical I/O in communication with the DVC; and
forward the I/O transaction to a physical layer I/O processing block in response to the determination that the I/O transaction is to be forwarded, wherein the DVC is implemented in hardware physically coupled to a host computing device and wherein the DVC is configured to virtualize the I/O to the host computing device to which the DVC is physically coupled.

17. The DVC of claim 16, wherein the host computing device is part of a distributed computing architecture.

18. The DVC of claim 16, wherein the virtual layer I/O processing block is further configured to send a notification to a host computing device associated with the DVC in response to the I/O transaction being forwarded to the physical I/O.

19. The DVC of claim 16, wherein the physical layer I/O processing block is further configured to receive a notification from the physical I/O in response to the I/O transaction being processed.

20. The DVC of claim 16, wherein the physical layer I/O processing block is configured to:
modify an address associated with the I/O transaction; and
forward the I/O transaction to the physical I/O.

21. The DVC of claim 20, wherein the physical layer I/O processing block is configured to modify an address associated with the I/O transaction concurrently with forwarding the I/O transaction to the physical I/O.

22. The DVC of claim 16, wherein the I/O transaction is a storage command for a host bus adapter.

23. The DVC of claim 16, wherein the I/O transaction is a descriptor for a network interface card.

24. A method, comprising:
receiving an input/output (I/O) transaction at a distributed virtualization controller (DVC) comprising circuitry physically coupled to a host computing device, wherein the DVC is configured to virtualize the I/O transaction to the host computing device on which the DVC is physically coupled;
identifying, in a virtualization layer associated with the DVC, a physical I/O to receive the I/O transaction; and
forwarding the I/O transaction to a physical layer associated with the DVC.

25. The method of claim 24, further comprising modifying an address associated with the I/O transaction.

26. The method of claim 25, further comprising modifying an address associated with the I/O transaction concurrently with receiving the I/O transaction at the DVC.

27. The method of claim 24, further comprising generating, by the DVC, an error indication in response to an error being detected by the DVC.

28. The method of claim 27, comprising generating the error indication in the form of an interrupt.

29. The method of claim 27, further comprising initiating a recovery mechanism on the physical I/O in response to the error indication being generated.

* * * * *